Figure 1:
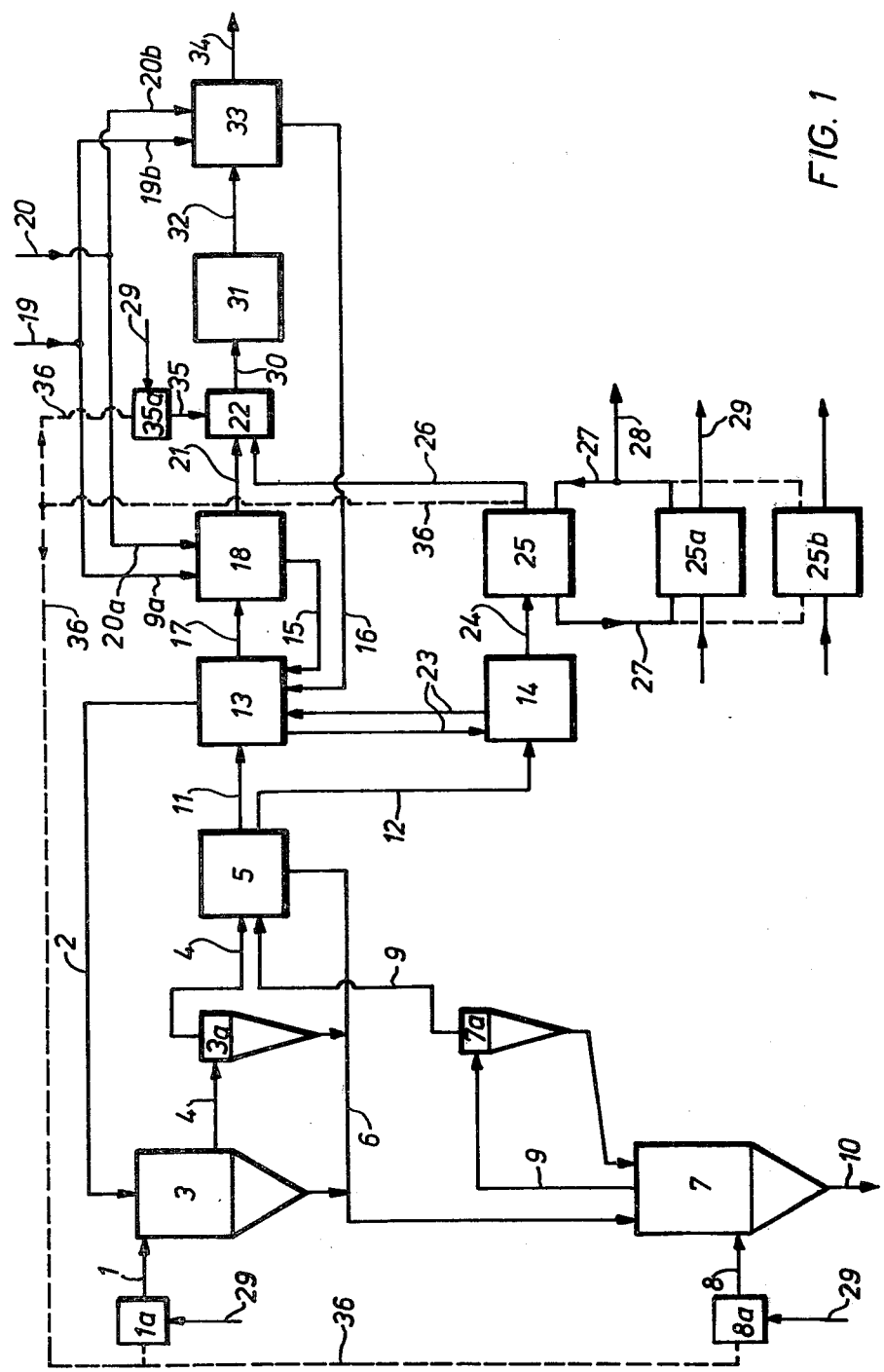

United States Patent [19]

Gerken et al.

[11] 4,153,628

[45] May 8, 1979

[54] WORKING UP SPENT SULPHURIC ACID SIMULTANEOUSLY WITH SULPHATE SALTS

[75] Inventors: Rudolf Gerken, Krefeld; Hans Guth, Leverkusen; Christoph Mucke, Krefeld; Willi Potes; Hermann Wieschen, Both of Cologne, all of Fed. Rep. of Germany

[73] Assignees: Bayer Aktiengesellschaft, Leverkusen; Metallgesellschaft Aktiengesellschaft, Frankfurt am Main, both of Fed. Rep. of Germany

[21] Appl. No.: 836,465

[22] Filed: Sep. 26, 1977

[30] Foreign Application Priority Data

Sep. 29, 1976 [DE] Fed. Rep. of Germany ....... 2643798

[51] Int. Cl.$^2$ .................... C01B 17/90; C01B 17/72; C01B 17/50
[52] U.S. Cl. ................................. 423/531; 423/522; 423/540; 423/DIG. 2
[58] Field of Search ............... 423/522, 530, 531, 540, 423/541 R, DIG. 2

[56] References Cited

U.S. PATENT DOCUMENTS

| 1,048,247 | 12/1912 | Weeks | 423/540 |
| 1,489,347 | 4/1924 | Davison | 423/522 |
| 2,098,056 | 11/1973 | McBerty | 423/531 |
| 2,255,445 | 9/1941 | Clarkson | 423/530 |
| 3,713,786 | 1/1973 | Umstead | 423/531 |
| 3,825,657 | 7/1974 | Jennines | 423/522 |
| 3,906,039 | 9/1975 | Furkert | 423/540 |
| 3,944,657 | 3/1976 | Furkert | 423/539 |
| 4,029,751 | 6/1977 | Dorr et al. | 423/522 |

FOREIGN PATENT DOCUMENTS

| 1667180 | 6/1971 | Fed. Rep. of Germany | 423/530 |
| 2415883 | 10/1975 | Fed. Rep. of Germany | 423/530 |
| 43-25129 | 10/1968 | Japan | 423/DIG. 2 |

*Primary Examiner*—O. R. Vertiz
*Assistant Examiner*—Gary P. Straub
*Attorney, Agent, or Firm*—Sprung, Felfe, Horn, Lynch & Kramer

[57] ABSTRACT

Spent sulphuric acid, either alongside or mixed with contaminated metal salts such as iron sulphate heptahydrate, is regenerated to fresh acid by countercurrent contact with gases from cleavage of the sulphate salts, such gases containing SO$_3$ which effects build up of the acid concentration. The built up acid is evaporated in another stage to obtain pure acid. The metal sulphate solids are subjected to high temperature cleavage, generating SO$_3$ which effects the previous concentration. Cleavage also produces some SO$_2$ which is converted to SO$_3$ by wet catalysis.

5 Claims, 3 Drawing Figures

WORKING UP SPENT SULPHURIC ACID SIMULTANEOUSLY WITH SULPHATE SALTS

This invention relates to a process for working up spent sulphuric acid, which may optionally contain metal sulphates, and for working up iron sulphate heptahydrate into sulphuric acid, these two process steps optionally being carried out together or separately.

Spent sulphuric acids in low concentrations of up to about 40% by weight, which normally contain up to about 25% by weight of metal sulphates, accumulate for example in the pickling of iron or in the production of titanium dioxide and have to be purified and regenerated before they can be reused. In addition, $FeSO_4.7H_2O$, known as green salt, accumulates in the production of titanium dioxide, for example.

Unfortunately, all conventional processes for working up these spent products provide only a partial solution to the problem, i.e., working up green salt or sulphuric acid containing metal sulphates in separate installations.

For example, DOS No. 1,667,180 describes a process for working up so-called thin acid containing metal sulphates, in which the hot cleavage gases are used for regenerating the thin acid. In a similar process according to DAS No. 2,210,637, the metal sulphates are separated off by centrifuging and are then split up separately from the sulphuric acid which still contains sulphate. Splitting is carried out at the usual high temperatures of from 850 to 1100° C., i.e., decomposition is carried out in such a way that the formation of sulphur dioxide is complete.

According to DOS No. 2,257,037, the expensive process steps, such as cooling, crystallization and mechanical separation of the sulphates, are said to be avoided by separating sulphuric acid, optionally preconcentrated to 50–60%, from the metal sulphates by total evaporation in an evaporator tower directly heated with heating gases. Although, in this way, the sulphates and pigment-forming salts are separated off, the formation of $SO_2$ and, hence, an expensive gas purifying treatment cannot be avoided on account of the hot fuel gases (800° to 1100° C.) in the evaporator stage. In addition, it is necessary to use a sulphur-free fuel if the amount of $SO_2$ in the end gas is not to be further increased. Furthermore, a separate splitting and contact installation is required for the further working up of the sulphates.

DOS No. 2,415,883 also relates to a total evaporation process, in which a spent acid is introduced into a heated fluidized bed and is separated from the entrained sulphates by total evaporation. After leaving the fluidized bed, the gases contaminated with dust-form salts and laden with sulphuric acid vapor enter separators where the dust-form salts are separated and are then returned, in some cases continuously, to the fluidized bed. The bases laden with sulphuric acid vapor are subjected to fractional condensation. This process is attended by the same disadvantages as the proposal described above because, for example where the fluidized bed is directly heated, it is necessary to work at high smoke gas temperatures which result in the formation of $SO_2$ through the splitting of sulphate. On the other hand, at lower smoke gas temperatures, the heat losses are too high and large quantities of gas are required. Where the fluidized bed is indirectly heated, the heating surfaces required are too large and the useful heat of the smoke gases and acid vapors cannot be utilized.

Accordingly, an object of the present invention is to find a process which avoids the adversities of conventional processes, such as splitting into $SO_2$ and subsequent oxidation into $SO_3$,
forced utilization of heat for generating steam, but the use of outside energy for acid evaporation,
consumption of cooling water although thin acid is available for cooling,
and crystallization solely for the purpose of mechanically separating salts, and which enables sulphate-containing acid and green salt to be worked up in any quantitative combination, such as that which is obtained, for example, as residues in the production of $TiO_2$.

Accordingly, the present invention provides a process for regenerating spent acid which may optionally contain metal sulphates and/or for the partial splitting of sulphates, especially iron sulphate heptahydrate, into sulphuric acid, in which the formation of sulphur dioxide is largely avoided and wherein the following process steps are combined:

(a) regenerating the acid in several stages with simultaneous dehydration of the dissolved and/or delivered sulphates in direct heat exchange in countercurrent with cleavage gases containing sulphur trioxide until an acid of maximum azeotropic composition is obtained in the final concentration stage A, (b) transferring the acid-sulphate mixture, which contains up to about 40% by weight of anhydrous sulphates, from the final concentration stage A to an evaporation stage B, in which the mixture is separated into substantially anhydrous sulphates and a gas containing sulphur trioxide at temperatures of up to about 450° C. which are generated by means of heating gases with temperatures of about 800° to 1200° C., (c) transferring the anhydrous sulphates to another cleavage stage C, in which the sulphates are decomposed in countercurrent with oxygen-containing heating gases with temperatures of about 800° to 1200° C. and, optionally, cleavage gases from stage D at temperatures of up to about 600° C. for conversion into sulphur-trioxide-containing cleavage gases and oxides, (d) transferring the gases from the cleavage stages B and c to the final concentration stage A, or optionally to a preceding condensation stage, in which the hot gases are scrubbed and cooled with a sulphate-containing acid which has a temperature of from about 260° to 338° C. and a concentration of between about 92% and the azeotropic composition, (e) transferring the sulphur-dioxide-containing gas, which is also formed in stages B and C, from the condensation and concentration stages for the conversion of sulphur dioxide into sulphur trioxide by wet catalysis.

By the process according to the invention, it is possible to work up not only metal sulphates, such as green salt for example, or sulphuric acid containing metal sulphates, but also both spent products both together and also separately. As a result, the process is highly variable and adaptable, for example to the spent products of different composition obtained in the production of titanium dioxide. Accordingly, the process provides a complete solution to the problem by working up all the spent materials which accumulate. The salt-containing acids to be regenerated, known as thin acid, are regenerated in the washing and condensation stages and the metal sulphates are dehydrated by the concentrated sulphuric acid, after which the suspension is separated by evaporation into acid vapors and dry sulphates. Evaporation is carried out in such a way that the acid vapors are azeotropic, i.e., largely split into $SO_3$. In the context of the invention, azeotropic acid is understood to be totally evaporated and partly dissociated 98.3% acid. In the process according to the invention, therefore, it is the splitting into $SO_3$ which is aimed at and not, as in other processes which are based on dry catalysis, the splitting into $SO_2$.

The acid vapors and the products of combustion, subsequent called smoke gases from the evaporator stage are delivered to a scrubber, in which the gases enter into direct heat exchange with sulphate-containing acid and are cooled accordingly. The dissipated heat is used for regenerating thin acid and also for evaporating the acid. The gas stream which, after passing through a condensation stage, contains hardly any more $SO_3$, is delivered through a mixing chamber to a wet catalyst. The anhydrous metal sulphates separated off in the evaporator stage enter a cleavage stage in which they are thermally decomposed. The hot $SO_3$-containing gases flowing off from the cleavage stage(s) are delivered to a scrubber and cooled, the heat given off being transferred to the evaporating recycle acid. The gas stream is further cooled, the $SO_3$ and sulphuric acid vapor being absorbed or condensed. The remaining gases, which only contain sulphur dioxide, are delivered together with the other gases through a mixing chamber to a wet catalyst.

By the highly variable process described above, it is possible for example to work up spent acids containing up to about 65% by weight and preferably up to 40% by weight of water containing sulphates. In general, acids containing about 10 to 45% by weight of sulfuric acid and up to at most about 20% by weight of metal sulphates are obtained in several other processes. Green salts may then be added to this thin acid, in amount such that the mixture comprises up to about 65% by weight of green salt, i.e., such a quantity of green salt that the suspension is still just transportable as a liquid. In another variant of the process, the green salt is not introduced into the thin acid to be worked up, but instead into an already concentrated and/or preconcentrated acid. These acids preferably have concentrations of from about 50 to 70% by weight, although it is also possible with equal effect to introduce the green salt into acids with a concentration of about 30 to more than 90% by weight.

In the context of the invention, the expression "countercurrent" means that the overall directions of the metal sulphates introduced and the $H_2SO_4$ or $SO_3$- and $SO_2$- containing gases are oppositely directed. However, this does not mean that this countercurrent takes place or has to take place in each of the individual stages.

Figure 2:
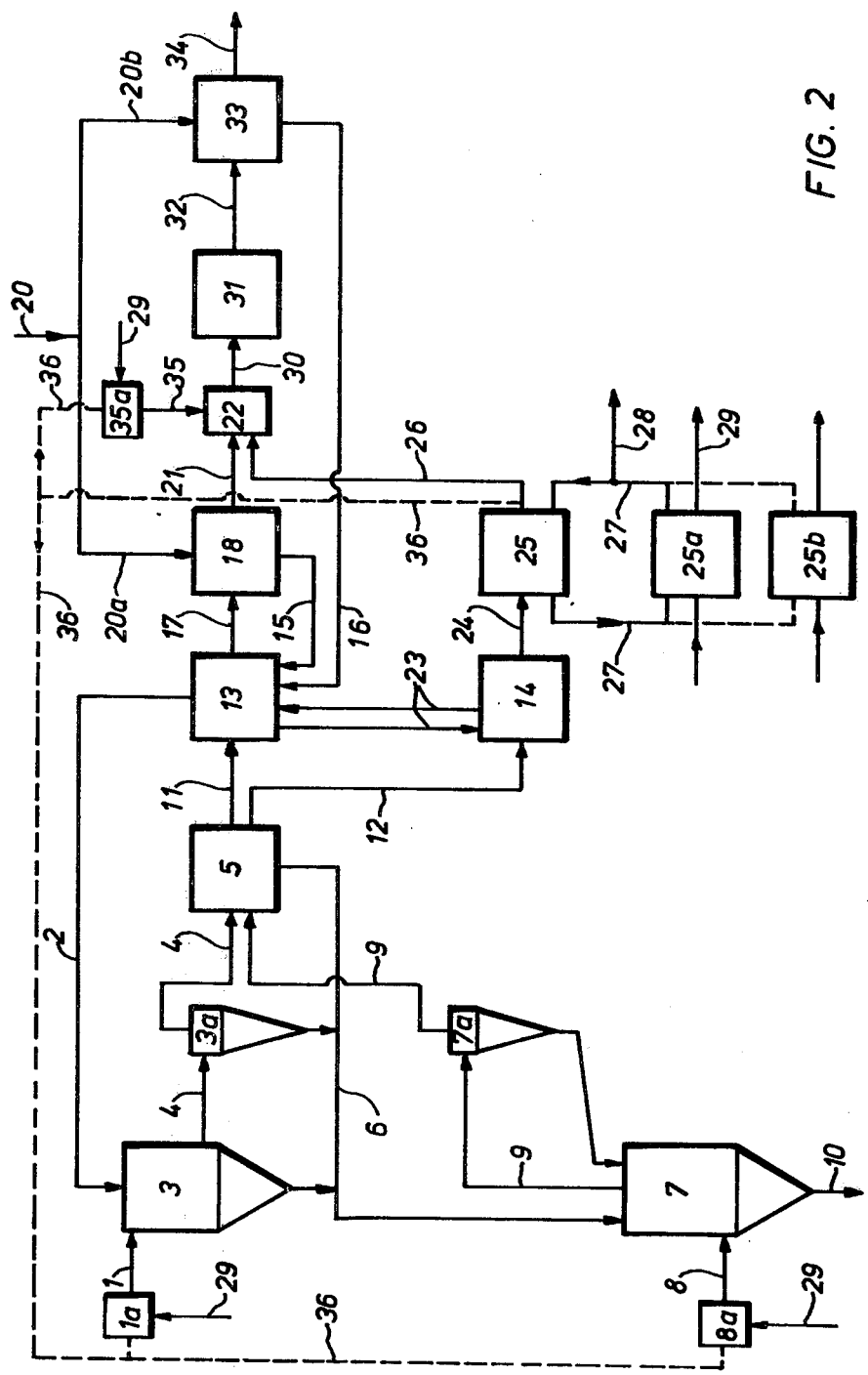
Figure 3:
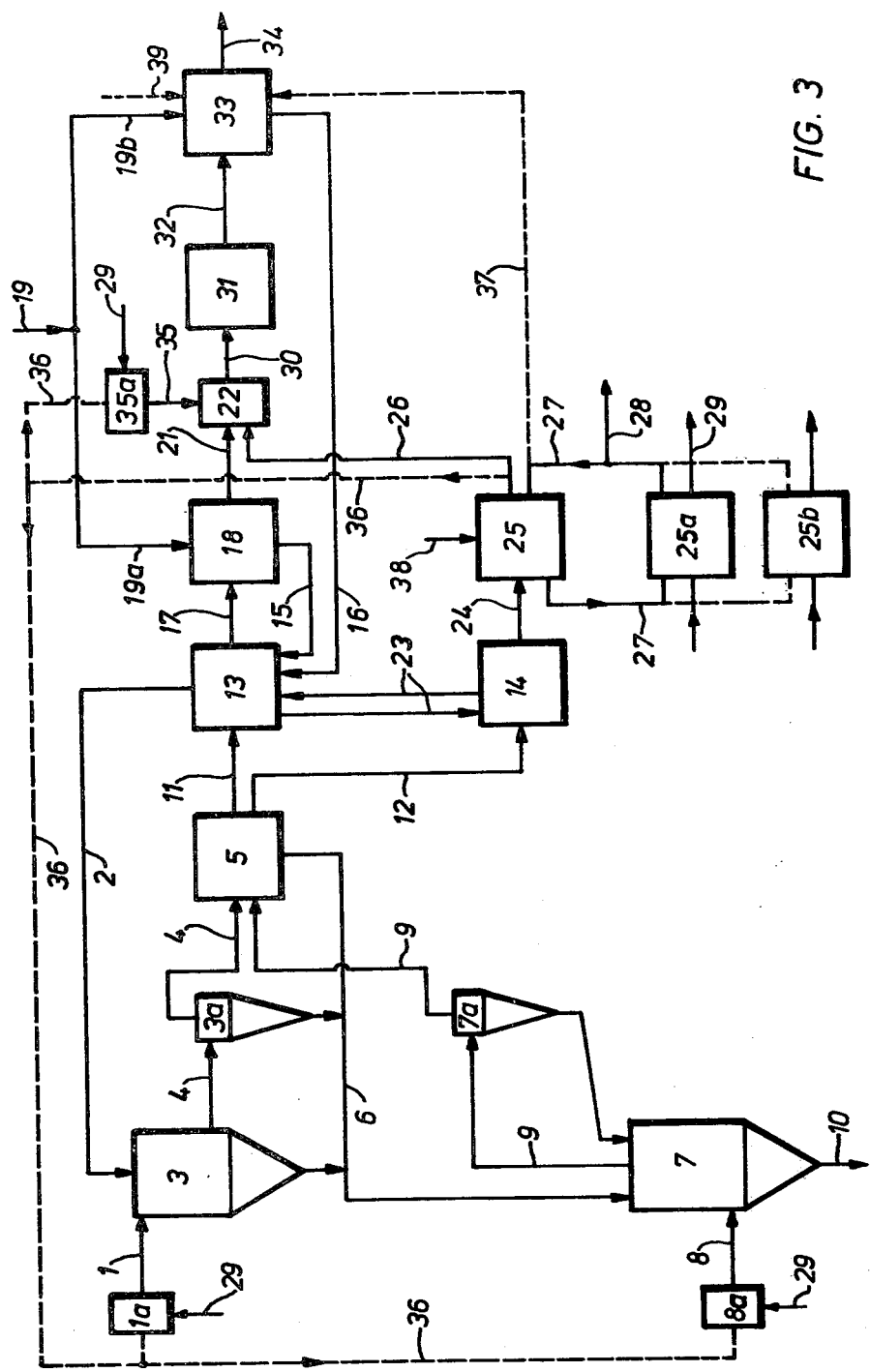

The invention will be further described with reference to the accompanying drawings, wherein:

FIG. 1 is a schematic flow sheet of an apparatus for carrying out the process of the invention with simultaneous processing of dilute acid and sulphate salts; and FIGS. 2 and 3 are flow sheets of variant processes, wherein acid and salt are separately processed.

The reference numerals used in FIGS. 1 to 3 have the following meaning:

| | |
|---|---|
| 1 | gas pipe between 1a and 3 |
| 1a | combustion chamber for 3 |
| 2 | pipeline between 3 and 13 |
| 3 | evaporation stage (separation by total acid evaporation) |
| 3a | dust separator (cyclone) |
| 4 | gas pipe between 3 and 5 |
| 5 | electrical dust separation |
| 6 | conveyor to 7 for metal sulphate |
| 7 | cleavage stage for iron sulphate |
| 7a | cyclone |
| 8 | gas pipe between 7 and 8a |
| 8a | combustion chamber for 7 |
| 9 | gas pipe between 7 and 5 |
| 10 | outlet for metal oxides |
| 11 | gas pipe between 5 and 13 |
| 12 | gas pipe between 5 and 14 |
| 13 | evaporation, cooling and washing |
| 14 | evaporation, cooling and washing |
| 15 | acid pipe between 13 and 18 |
| 16 | acid pipe between 13 and 33 |
| 17 | gas pipe between 13 and 18 |
| 18 | cooling, absorption and concentration stage |
| 19 | green salt input |
| 19a | green salt input into 18 |
| 19b | green salt input into 33 |
| 20 | thin acid input |
| 20a | thin acid input into 18 |
| 20b | thin acid input into 33 |
| 21 | gas pipe between 18 and 22 |
| 22 | mixing chamber |
| 23 | acid circuit between 13 and 14 |
| 24 | gas pipe between 14 and 15 |
| 25 | cooling and absorption stage |
| 25a | acid condenser |
| 25b | acid condenser |
| 26 | gas pipe between 25 and 22 |
| 27 | pipe line for acid circuit between 25, 25a and 25b |
| 28 | acid take-off |
| 29 | combustion air input to 1a, 8a and 35a |
| 30 | gas pipe between 22 and 31 |
| 31 | wet catalyst |
| 32 | gas pipe between 31 and 33 |
| 33 | cooling, absorption and concentration stage |
| 34 | end gas pipe to 33 |
| 35 | gas pipe between 35a and 22 |
| 35a | combustion chamber for 22 |
| 36 | return gas pipe to 1a, 8a and 35a |
| 37 | pipeline for acid between 25 and 33 (in Fig. 3 only) |
| 38 | water feed to 25 (in Fig. 3 only) |
| 39 | water feed to 33 (Fig. 3 only). |

Referring now more particularly to FIG. 1, the thin acid is regenerated in the washing and condensation stages (13–18, 33) and the metal sulphates are dehydrated by the concentrated sulphuric acid, this dehydration normally taking place at least as far as the iron sulphate monohydrate, but preferably as far as the anhydrous sulphates.

The suspension is delivered through the pipe-line (2) into an evaporator (3) in which it is separated by total evaporation into azeotropic acid vapors and dry sulphates by smoke gases (1). The smoke gases enter the evaporator at temperatures of from about 800° to 1200° C. However, the separation by evaporation is carried out in such a way that the issuing acid vapors and smoke gases preferably have a temperature of about 380° to 420° C., the process temperature range being between about 290° and 450° C. The sulphuric acid is present in azeotropic form i.e., largely split into $SO_3$.

The acid vapors and smoke gases from the evaporator stage (3) are delivered through a dust separator (3a), which may optionally be followed by another gas purifying stage, for example an EGR (5), into a scrubber (13, 14), for example a Venturi scrubber, where the gases enter into direct heat exchange with sulphate-containing acid and are cooled accordingly to temperatures of from about 150° to 320° C.

The heat dissipated is used for regenerating thin acid and also for evaporating the acid. The amount of heat required in the concentration and dehydration stages is preferably applied by an increase in the internal circuit of acid and acid vapors between the washing and cooling stage and the evaporation stage. The heat to be dissipated from the acid produced is advantageously directly delivered to the combustion stages. The issuing gas stream (from 14) is cooled in one or, optionally, several condensation stages (25) to temperatures of from 220° to 140° C. The gas stream, which now contains hardly any more $SO_3$, is delivered through a mixing chamber (22) to a wet catalyst (31). The wet catalyst is optionally followed by a sulphuric acid mist trap operated with about 50 to 80% and preferably with about 65% sulphuric acid. The regenerated thin acid (20) is returned with metal sulphates (19) to the scrubber (13).

The temperature in the evaporator stage and the concentration of acid in the scrubber are adjusted in such a way that the sulphates introduced are dehydrated. In the evaporator stage, this is the case at temperatures of from about 450° to 300° C. and preferably at temperatures of from 410° to 325° C.

The anhydrous metal sulphates separated off in the evaporator stage enter a cleavage stage (7) in which they are thermally decomposed in countercurrent by heating gases (8). Decomposition is controlled in such a way that solids temperatures of 600° C. are not exceeded or not appreciably exceeded so that as far as possible only $SO_3$ is formed during the decomposition process. Any $SO_2$ formed is largely converted catalytically into $SO_3$ in the presence of iron oxide and oxygen corresponding to the equilibrium conditions in the cooling gas stream.

The $SO_3$-containing gases flowing off from the cleavage stage are delivered through a dust separator (7a) and optionally through another gas purifying stage (5), optionally with at least a component stream from the evaporator stage (3) into a scrubber (14), for example a Venturi scrubber, and cooled to temperatures of from about 250° to 320° C. The heat is transferred to the evaporating recycle acid.

In one or more other absorbers or condensers (25) the gas stream is fruther cooled to temperatures of about 150° to 250° C., the $SO_3$ and sulphuric acid vapors being absorbed or condensed. The remaining gases, which only contain sulphur dioxide, are delivered together with the other gases through a mixing chamber (22) to the wet catalyst (31) and/or to the combustion chambers.

After contact with the catalyst, they enter a preferably multistage condensation unit (33), in which they are absorbed by thin acid and at the same time, by virtue of their temperature in conjunction with the heat of condensation and formation given off, contribute towards the regeneration and dehydration of this sulphate-containing thin acid.

In cases where the sulphates are split at temperatures of about 600° C., magnesium sulphate, which may be present in spent acids in a concentration of up to 3.5% by weight, is not split. Accordingly, the sulphate splitting stage is optionally followed by another splitting stage D (after 10), in which magnesium sulphate is split at temperatures above 1000° C.

In one variant of the process, salt-containing spent acid may be worked up without the addition of green salt, e.g. FIG. 2. The spent acid is concentrated in the washing and condensation stages (13–18, 33), dehydrated, collected in scrubbers (13, 14) and delivered to the evaporation stage (3). The acid vapors and smoke gases are delivered through a dust separator (3a) and, optionally, an EGR (5) to the scrubber (13), while the metal sulphates enter a splitting stage (7). In other respects, this variant of the process corresponds to the first variant described above.

In another variant of the process, it is possible to work up green salt alone. However, a certain initial quantity of sulphuric acid is required, although it may be used of a variety of concentrations. In this variant, too, the green salt is again added to the acid, dehydrated (16–18, 33) and delivered with the recycled acid into the evaporation stage (3). In other respects, this variant of the process corresponds to the first variant.

The process according to the invention is described in more detail in, but is by no means limited by, the following examples.

EXAMPLE 1

The installation illustrated in FIG. 1 is designed for working up approximately 1000 tons per day of green salt with a moisture content of 5% and approximately 1700 tons per day of spent acid containing approximately 23.5% of $H_2SO_4$, 11.6% of $FeSO_4$ and 3.3% $MgSO_4$ and other metal sulphates. In the following calculations and the quantities indicated only the values concerning $FeSO_4$ are given and the partial formation of $Fe_2(SO_4)_3$ and $Fe_3O_4$ is not taken into consideration as it can be neglected of.

After heating, the spent acid and green salt are proportionately added to the two washing and condensation stages 13 and 18 and also 33 where they are concentrated and dehydrated, collected in the scrubber 13 and delivered with recycled acids to the evaporator stage 3.

Acid (1500 tons per day, ~290° C., ~98.3%) and metal sulphates (780 tons per day, 290° C.) are introduced into the evaporator 3 through the feed pipe 2, smoke gases (104,000 Nm³/h, 1000° C.) being introduced through the pipe 1. In the evaporator 3, the acid is evaporated and separated from the sulphates. Acid vapors and smoke gases (400° C., 134,000 Nm³/h) are delivered through the dust separator 3a (pipe 4) to the EGR 5. The metal sulphates enter the cleavage stage 7 through the outlet 6. In the cleavage stage, the iron sulphate is thermally decomposed in countercurrent to the heating gases introduced through the pipe 8 (29,000 Nm³/h, 1000° C.) until $SO_3$ is separated. Any $SO_2$ formed is catalyzed into $SO_3$ in the presence of iron oxide and oxygen corresponding to the equilibrium conditions in the cooling gas stream.

The gases flowing off (400° C., 29,000 Nm³/h + 15,800 kg of $SO_3$/h in the form of $SO_2$ and $SO_3$) are delivered through the dust separator 7a and pipe 9 to the EGR 5. After the EGR 5, the gases (166,000 Nm³/h, 400° C.) are divided up according to the $SO_3$-product output and are delivered through the pipes 11 and 12 to the scrubbing stages 13 (124,000 Nm³/h) and 14 (42,000 Nm³/h).

In the scrubber 13, the gas is cooled to approximately 290° C. in direct that exchange with sulphate-containing acid (~98.3%, 290° C., 34% $MeSO_4$), the heat to be dissipated being used for removing $H_2O$ from the acid and sulphates introduced through the pipes 15 and 16 and also for evaporating acid. The issuing gas stream (130,000 Nm$^3$/h, 43 Torr SO$_3$, 43 Torr H$_2$SO$_4$ and 89 Torr H$_2$O, rest CO$_2$, N$_2$, O$_2$) is delivered through the pipe 17 to the condensation stage 18 where it is cooled to approximately 200° C. in two stages. The heat liberated is used for removing H$_2$O from the green salt delivered through the pipe 19a (~22,000 kg/h) and the spent acid introduced through 20a (~39,000 kg/h). The quantity of green salt may be increased and the quantity of acid reduced accordingly when required by the concentration of salt after the catalyst. The gas stream depleted of SO$_3$ and H$_2$SO$_4$ (142,000 Nm$^3$/h, 200° C.) is run off through the pipe 21 to the mixing chamber 22. The regenerated spent acid is delivered to the scrubber 13 through the pipe 15 with the metal sulphates and the condensed recycle acid.

In the scrubber 14, the component gas stream (42,000 Nm$^3$/h, 400° C., 77 Torr SO$_3$, 7 Torr SO$_2$ and 71 Torr H$_2$O) is washed with suspension (~98.3%, 290° C.) delivered through the pipe 23 in the circuit between 13 and 14, and is cooled to ~290° C. The heat is used for the evaporation of approximately 15,000 kg/h of acid from the circuit. The issuing gas stream 24 is cooled to approximately 200° C. with acid (~98.3%, ~200° C.) in the absorber 25, the SO$_3$ and H$_2$SO$_4$ vapors being absorbed or condensed corresponding to the prevailing partial pressures (0.2 Torr SO$_2$, 2 Torr H$_2$SO$_4$, 8 Torr H$_2$O). The SO$_3$ recovered (27,160 kg/h, ~98.3% H$_2$SO$_4$) is run off as a component stream from the cooling acid circuit through the outlet 28. The gases are delivered through the pipe 26 to the mixing chamber.

Heating gases (58,000 Nm$^3$/h, 1000° C.) are delivered through the pipe 35 to the mixing chamber 22, giving a gas (234,000 Nm$^3$/h, 400° C., 0.7% by volume SO$_2$/SO$_3$) which flows through the pipe 30 to the wet catalyst 31 where it is contacted (conversion ~98%) and flows through the pipe 32 to the four-stage condensation stage 33.

In the condensation stage 33, the gas is cooled in four stages to 280° C., 240° C., 150° C. and 100° C. and the SO$_3$ present in it is absorbed. The heat liberated is used for removing H$_2$O from the green salt (20,000 kg/h) delivered through the pipe 19b and from the spent acid (32,000 kg/h) delivered through the pipe 20b. The gases (258,000 Nm$^3$/h, 100° C., 225 Torr H$_2$O) leave the installation through the pipe 34. The regenerated spent acid, the metal sulphates and the SO$_3$ absorbed from the gas are delivered through the pipe 16 (14,200 kg of H$_2$SO$_4$/h, ~94%, 15000 kg/h of sulphate, 280° C.) to the scrubber 13.

EXAMPLE 2

The installation illustrated in FIG. 2 is designed for working up approximately 1700 tons per day of spent acid containing approximately 23% of H$_2$SO$_4$, 11.6% of FeSO$_4$ and 3.3% of MgSO$_4$ and other metal sulphates. Of the sulphates, only the iron sulphate is worked up for the purposes of the quantities indicated. The partial formation of Fe$_2$(SO$_4$)$_3$ and Fe$_3$O$_4$ is not taken into consideration in the quantities indicated.

Corresponding to the input of heat, the spent acid is proportionately delivered to the two washing and condensation stages 13-18 and 33 where it is concentrated and dehydrated, collected in the scrubber 13 and delivered with the recycled acid to the evaporator stage 3.

In the evaporator stage 3, the acid (~1100 tons per day, ~290° C., ~98.3%) is evaporated off from the sulphates (~250 tons per day, 290° C.) with approximately 75,000 Nm$^3$/h of smoke gases (1000° C., pipe 1).

The acid vapors and smoke gases (~97,000 Nm$^3$/h, 400° C.) are delivered through the dust separator 3a and the pipe 4 to the EGR 5, while the metal sulphates are delivered through the outlet 6 to the cleavage stage 7 where the iron sulphate is thermally decomposed in countercurrent to the heating gases introduced through the pipe 8 (~8500 Nm$^3$/h, ~1000° C.) until SO$_3$ is separated. The SO$_2$ inevitably formed is converted catalytically into SO$_3$ in the presence of iron oxide and oxygen corresponding to the equilibrium conditions in the cooling gas stream.

The gases flowing off (400° C., ~8300 Nm$^3$/h + 4400 kg/h of SO$_3$ in the form of SO$_3$ and SO$_2$) are delivered to the EGR 5 through the dust separator 7a and the pipe 9. After the EGR 5, the gases (~106,500 Nm$^3$/h, 400° C.) are divided up according to the output of the SO$_3$ product between the washing stages 13 (~82,000 Nm$^3$/h) and 14 (18 24,300 Nm$^3$/h).

In the scrubber 13, the gas is cooled to approximately 290° C. in direct heat exchange with sulphate-containing acid (98.3%, 290° C., 18.5% Me SO$_4$), the heat liberated being used for removing H$_2$O from the acids and sulphates delivered through the pipes 15 and 16 and also for evaporating acid. The issuing gas stream (~89,000 Nm$^3$/h, 46 Torr SO$_3$, 46 Torr H$_2$SO$_4$, 6 Torr SO$_2$ and 112 Torr H$_2$O) is delivered through the pipe 17 to the condensation stage 18 where it is cooled in two stages to approximately 200° C. The heat liberated is used for removing H$_2$SO$_4$ from the spent acid (~850 tons per day) delivered through the pipe 20a. The gas stream depleted in SO$_3$ and H$_2$SO$_4$ (~95,500 Nm$^3$/h, 200° C.) is run off through the pipe 21 to the mixing chamber 22. The regenerated spent acid is delivered through the pipe 15 to the scrubber 13 with the metal sulphates and the condensed recycle acid.

In the scrubber 14, the component gas stream ~24,300 Nm$^3$/h, 400° C., 75 Torr SO$_3$, 7 Torr SO$_2$, 82 Torr H$_2$O) is washed with acid (98.3%, 290° C.) delivered through the pipe 23 in the circuit between 13 and 14, and is cooled to 290° C. The heat liberated is used for evaporating approximately 9000 kg of acid from the circuit. The issuing gas stream (pipe 24) is cooled to approximately 200° C. with acid (96%, < 200° C.) in the absorber 25, the SO$_3$ and H$_2$SO$_4$ vapors being absorbed or condensed according to the prevailing partial pressures (0.1 Torr SO$_3$, 2 Torr H$_2$SO$_4$, 8 Torr H$_2$O). The SO$_3$ recovered ( ~ 19,500 kg/h H$_2$SO$_4$, ~ 96%) is run off as a component stream from the cooling acid circuit through the outlet 28. The gases are delivered to the mixing chamber through the pipe 26.

Heating gases (~ 36,000 Nm$^3$/h, 1000° C.) are delivered to the mixing chamber through the pipe 35, giving a gas (approximately 150,000 Nm$^3$/h, 400° C., 0.7% by volume SO$_2$/SO$_3$) which flows through the pipe 30 to the wet catalyst 31 where it is contacted (conversion ~ 98%) and delivered through the pipe 32 to the four-stage condensation stage 33.

In the condensation stage 33, the gas is cooled in four stages (180° C., 240° C., 150° C. and 100° C.) and the SO$_3$ present in it is absorbed. The heat liberated is used for removing H$_2$O from the spent acid ( ~ 850 tons per day) delivered through the pipe 20b.

The gases (~175,000 Nm$^3$/h, 100° C., 244 Torr H$_2$O) leave the installation through the pipe 34. The regenerated spent acid, the metal sulphates and the SO$_3$ absorbed from the gas are delivered to the scrubber 13 through the pipe 16 ( ~ 12,000 kg/h H$_2$SO$_4$, 94%, ~ 6000 kg/h sulphate, 280° C.).

EXAMPLE 3

The installation illustrated in FIG. 3 is designed for working up approximately 1000 tons per day of green salt with a moisture content of 5%. The partial formation of Fe$_2$(SO$_4$)$_3$ and Fe$_3$O$_4$ is not taken into consideration in the quantitative balances.

According to the input of heat from the catalyst stage, the green salt is proportionately delivered to the two washing and condensation stages 16 to 18 and 33 where it is dehydrated, collected in the scrubber 13 and delivered with the recycle acid (pipe 2, approximately 1000 tons per day of ~ 98.3% acid 290° C., containing approximately 520 tons per day of iron sulphate) to the evaporation stage 3.

In the evaporation stage 3, the acid is evaporated off from the sulphates with approximately 41,500 Nm$_3$/h of smoke gases (1100° C., pipe 1). The acid vapors and smoke gases (350°–400° C.) are delivered through the dust separator 3a (pipe 4) to the EGR 5. The metal sulphates enter the cleavage stage 7 through the output 6. In the cleavage stage 6, the iron sulphate is thermally decomposed in countercurrent to the heating gases delivered through the pipe 8 ( ~ 16,500 Nm$^3$/h, 1100° C.) until SO$_3$ is separated. The SO$_2$ inevitably formed is converted catalytically into SO$_3$ in the presence of iron oxide and oxygen corresponding to the equlibrium conditions in the cooling gas stream.

The gases flowing off (350°–400° C., 16,500 Nm$^3$/h + 11,500 kg/h of SO$_3$ in the form of SO$_3$ and SO$_2$) are delivered through the dust separator 7a and the pipe 9 to the EGR 5. After the EGR, the gases (approximately 58,000 Nm$^3$/h + 44,000 kg/h of SO$_3$ in the form of SO$_2$, SO$_3$ and H$_2$SO$_4$) are divided substantially equally between the scrubbers 13 and 14.

In the scrubber 13, the gas is cooled to about 290° C. in two stages ( ~ 98.3%/97.5%) in direct heat exchange with the sulphate-containing acid (approximately 34% of sulphate), the heat liberated being used for removing H$_2$O from the acids and sulphates delivered through the pipes 15 and 16 and for evaporating acid.

The issuing gas stream ( ~ 39,000 Nm$^3$/h, 44 Torr SO$_3$, 7 Torr SO$_2$, 88 Torr H$_2$SO$_4$ and 56 Torr H$_2$O) is delivered through the pipe 17 to the condensation stage 18 where it is cooled in two stages (90%/85%) to about 190° C. The heat liberated is used for removing H$_2$So$_4$ from the green salt (approximately 750 tons per day) delivered through the pipe 19a. The gas stream depleted in SO$_3$ and H$_2$SO$_4$ ( ~ 44,000 Nm$^3$/h) is delivered through the pipe 21 to the mixing chamber 22. The acid formed by the condensation of H$_2$SO$_4$ and absorption of SO$_3$ is delivered to the scrubber with the iron sulphate through the pipe 15.

In the scrubber 14, the component gas stream ( ~ 39,000 Nm$^3$/h, 98 Torr SO$_3$, 14 Torr H$_2$SO$_4$, 98 Torr H$_2$O, 7 Torr SO$_2$) is washed with boiling, approximately 98.2% acid delivered through the pipe 23 in the circuit between 13 and 14, and is cooled to 290° C. The heat to be dissipated is removed from the circuit by the evaporation of acid, as in the scrubber 13. The issuing gas stream ( ~ 39,000 Nm$^3$/h, 44 Torr SO$_3$, 7 Torr SO$_2$, 88 Torr H$_2$SO$_4$ and 56 Torr H$_2$O) 24 is cooled in two stages (96%/94%) to approximately 195° C. in the absorber 25, the SO$_3$ and H$_2$SO$_4$ vapors being absorbed or condensed according to the prevailing partial pressures ( ~ 20 Torr H$_2$O, 0.01 Torr SO$_3$, 0.5 Torr H$_2$SO$_4$). The SO$_3$ recovered is removed from the cooling circuit through the outlet 28 (approximately 275 tons per day of SO$_3$ in the form of 96% H$_2$SO$_4$).

The remainder of the corresponding acid ( ~ 18,000 kg/h is delivered through the pipe 37 to the absorption stage 33.

The larger part of the issuing gas flows through the pipe 36 ( ~ 22,000 Nm$^3$/h) to the combustion chambers 1a, 35a and 8a for recombustion. Like the quantity of gas from 18 (pipe 21), the rest is delivered through the pipe 26 to the mixing chamber 22 where it is brought to the working temperature of the wet catalyst 30 by the addition of approximately 18,000 Nm$^3$/h of hot smoke gases (1000° C.).

The catalyst-contacted gas ( ~ 68,000 Nm$^3$/h, 7.8 Torr SO$_3$, 150 Torr H$_2$O) is delivered through the pipe 32 to the four-stage absorption stage 33. In the absorption stage 33, the gas is cooled in four stages and the SO$_3$ present in it is absorbed. The heat liberated is used for removing H$_2$O from the green salt ( ~ 250 tons per day) delivered through the pipe 19b and for evaporating H$_2$O (pipe 39, ~ 5000 kg/h). The gases ( ~ 85,000 Nm$^3$/h, 100° C., 26 Torr H$_2$O) leave the installations through the pipe 34. The metal sulphates and the SO$_3$ absorbed from the gas are delivered to the scrubber 13 through the pipe 16 ( ~ 29,000 kg/h in the form of 96% H$_2$SO$_4$, 7000 kg/h in the form of sulphate, ~ 280° C.).

It will be appreciated that the instant specification and examples are set forth by way of illustration and not limitation, and that various modifications and changes may be made without departing from the spirit and scope of the present invention.

What is claimed is:

1. A process for regenerating sulphuric acid from spent sulphuric acid containing metal sulphates in up to about 65% by weight and for the partial splitting of such sulphates, when present, into sulphuric acid, comprising:

a. in several stages hereof concentrating the spent acid with simultaneous dehydration of the metal sulphates in direct heat exchange in countercurrent flow with a portion of the hot gases containing sulphur trioxide from step (d) until a residue from the final concentration stage comprising an acid-sulphate mixture is obtained, the acid concentration in said mixture being about 98%, b. transferring the acid-sulphate mixture from to final concentration stage to an evaporation stage and supplying thereto heating gases at a temperature from about 800 to 1200° C., thereby to produce substantially anhydrous sulphates and a gas containing sulphur trioxide and sulphur dioxide at a temperature up to about 450° C., c. transferring the anhydrous sulphates to a cleavage stage and supplying thereto, in a countercurrent flow, oxygen-containing heating gases at a reaction temperature of at most 600° C. to decompose the sulphates into sulphur trioxide and sulphur dioxide-containing cleaving gases and oxides, d. combining the gases from steps (b) and (c), e. transferring a portion of the gases from step (d) to step (a) and scrubbing and cooling the hot gases in the final concentration stage of step (a) with a sulphate-containing acid which has a temperature of from about 260 to 338° C. and a concentration of between about 92% and 98.3%, thereby to convert the sulphur trioxide contained in said gases to sulphuric acid while forming the acid-sulphate mixture of step (a), and generating a gascontaining water vapor and sulphur dioxide, which is sent to the other concentration stages prior to being sent step (g), f. recovering the sulphur trioxide from the other portion of the gases from step (d) as sulphuric acid and passing the resulting sulphur dioxidecontaining gas to step (g), g. converting the sulphur dioxide in the gas from (e) and (f) to sulphur trioxide by wet catalysis, and h. passing the gas from step (g) to at least one of the concentration stages of step (a) before the final concentration stage.

2. A process as claimed in claim 1, wherein the $SO_3$-absorption of step (e) is operated in several stages in the final concentration in countercurrent with acid, one of the several concentration stages of step (a) having an acid concentration of approximately 65% and being operated in the form of a sulphuric acid mist trap following the wet catalysis of step (g).

3. A process as claimed in claim 1, wherein the sulphates initially are hydrated and the temperature and concentration of acid in step (a) are such that the sulphates are dehydrated.

4. A process according to claim 1, wherein the mixture of acid and sulphate formed in (a) contains up to about 40% by weight of sulphates on an anhydrous basis.

5. A process according to claim 1 wherein the spent acid contains magnesium sulphate in addition to other sulfates, the cleavage in step (c) serving to cleave such other sulfates, the process including the further step of cleaving at a temperature in excess of 1000° C. the magnesium sulfate which is not cleaved in step (c).

* * * * *